Dec. 12, 1933.  C. L. JOHNSON  1,939,555
SHAFT COUPLING
Filed Feb. 19, 1932  2 Sheets-Sheet 1

Charles L. Johnson,
INVENTOR
BY Victor J. Evans
ATTORNEY

Dec. 12, 1933.                C. L. JOHNSON                1,939,555
                              SHAFT COUPLING
                         Filed Feb. 19, 1932          2 Sheets-Sheet 2
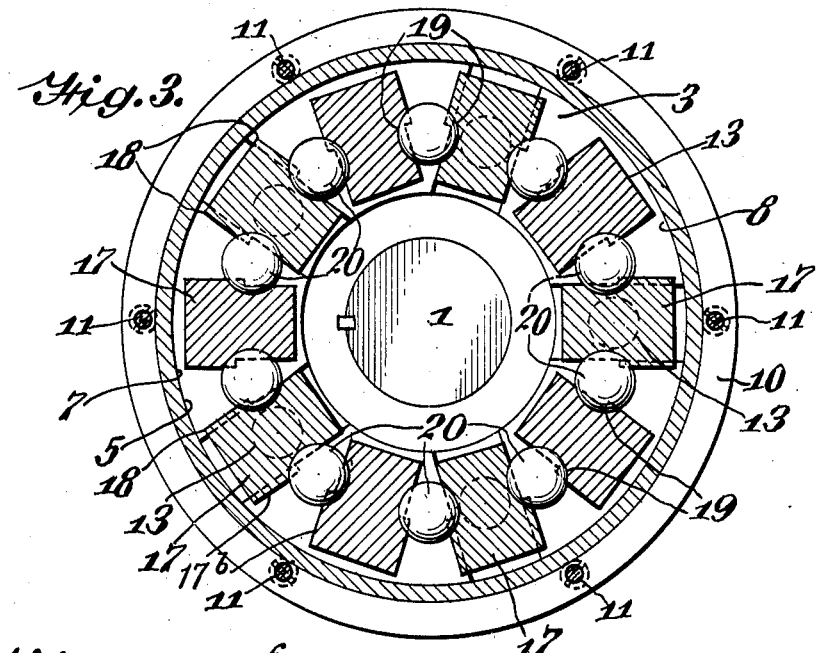
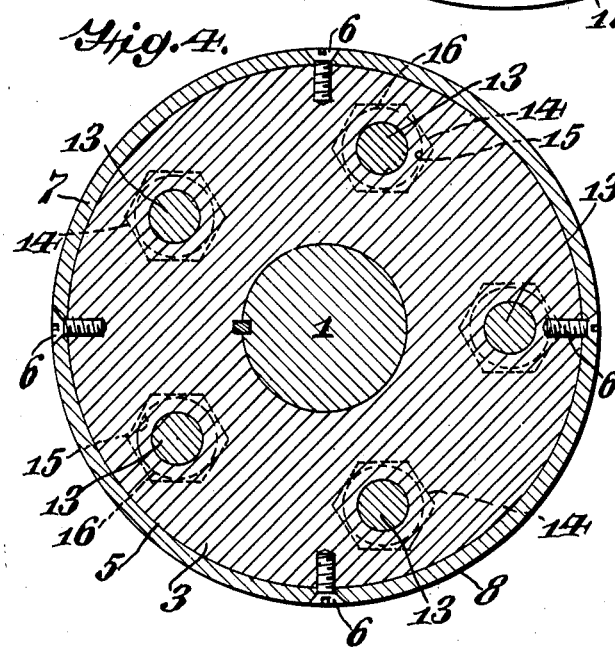
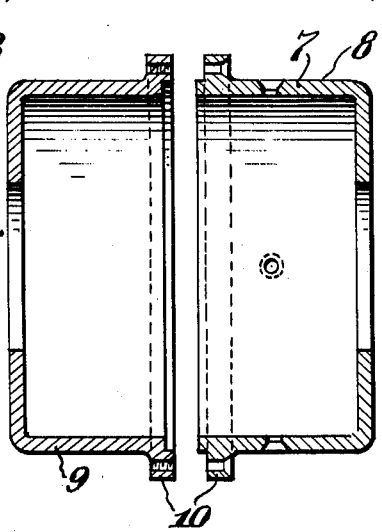
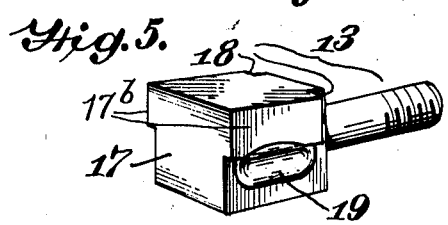
Charles L. Johnson,
                INVENTOR
BY Victor J. Evans & Co.
                ATTORNEY Patented Dec. 12, 1933

1,939,555

UNITED STATES PATENT OFFICE 1,939,555

SHAFT COUPLING

Charles L. Johnson, Trenton, N. J.

Application February 19, 1932. Serial No. 594,072

1 Claim. (Cl. 64—91)

The present invention relates to an improved shaft coupling, and especially to an article of this kind, where two shaft sections are capable of slight axial movements as well as slight oscillatory movements relative to each other, and still permit the two shaft sections to rotate as a unit.

A shaft consisting of two sections with a coupling of the present type connecting them can be used in many instances where such movements of the shaft sections are necessary and required. The present construction of coupling may serve a useful purpose, where one or both of the shaft sections are required to have slight axial movements toward each other, as well as slight oscillatory movements, due to the fact that a body carrying one of the shaft sections may have to have vibrating movements vertically and laterally as well as forwardly and rearwardly.

Another purpose is to provide, in a coupling of this kind, two opposing heads carried by the adjacent axial ends of the shaft sections, with headed elements carried by the heads, the heads of the elements intermeshing, with anti-frictional ball bearings in channels of the adjacent faces of the heads of said elements, in order to permit of rigid connections between the heads for driving purposes, yet allowing the shaft sections to move axially toward and from each other as well as permitting them to oscillate, in combination with a sectional housing for the coupling, to protect the parts thereof, as well as rendering the construction relatively dust proof.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 3 is a cross sectional view on line 3—3 of Figure 1 showing the intermeshing of the heads of the elements.

Figure 4 is a transverse sectional view on line 4—4 of Figure 1 showing how the casing is fastened to one of the heads on one end of one of the shaft sections.

Figure 5 is a detail view of one of the headed elements.

Figure 6 is a detail view of one of the sections of the housing.

Figure 1:
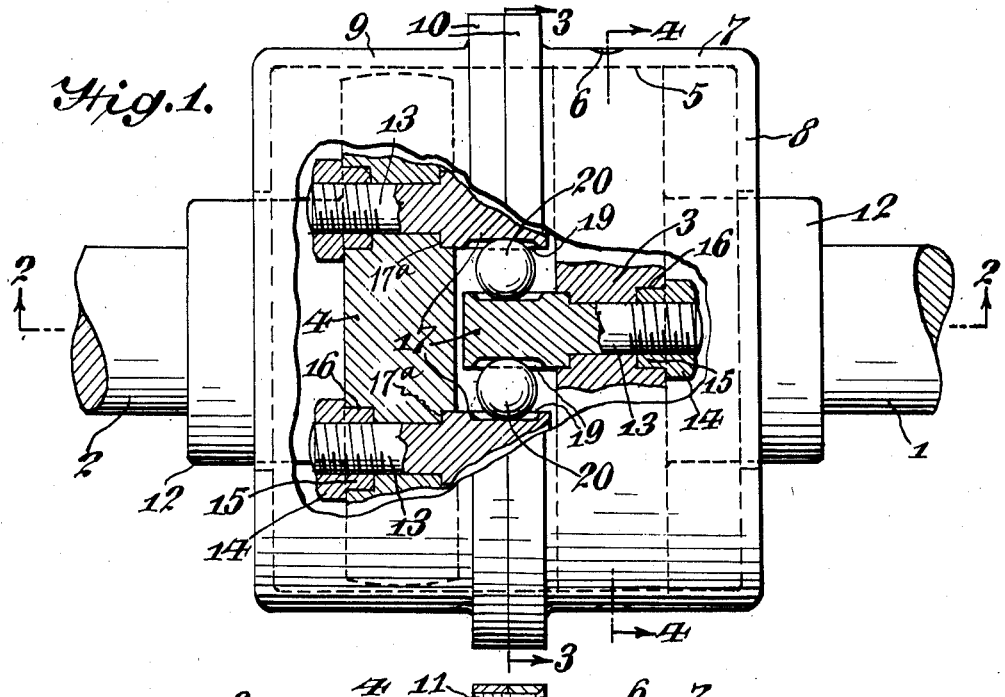
Figure 1 is a view in elevation of the approved coupling as applied to the adjacent ends of the two shaft sections with parts of the two house sections broken away to show portions of the interior structure.
Figure 2:
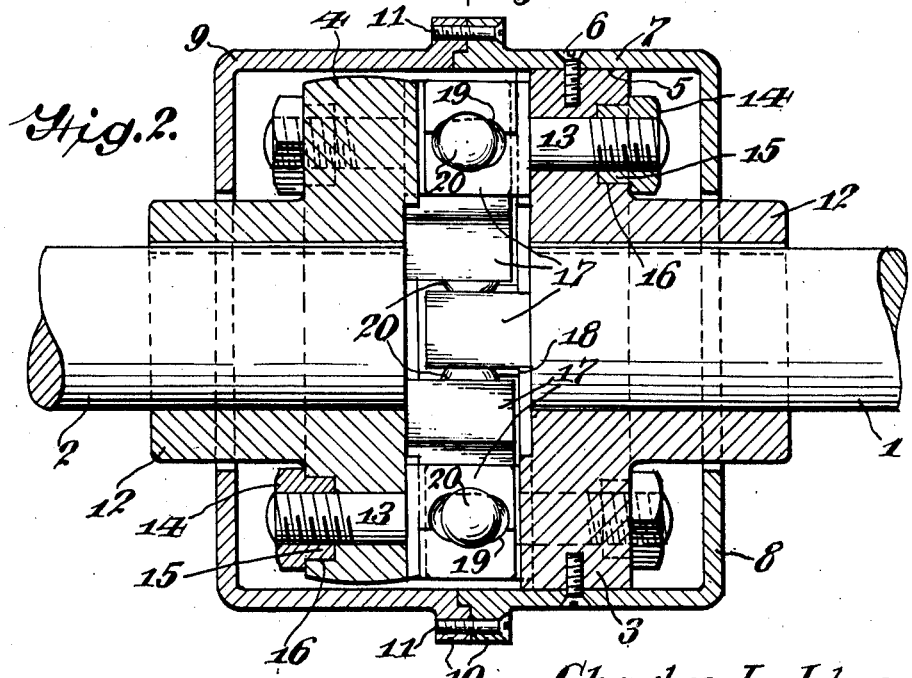
Figure 2 is a sectional view on line 2—2 of Figure 1 longitudinally thereof.

Referring to the drawings 1 and 2 identify two shaft sections on adjacent ends of which heads 3 and 4 are so closely fitted and keyed as to rotate with the sections of the shaft.

Both heads are circular, but the head 3 has a cylindrical surface at 5 and is fastened by screws 6 on the interior of the section 7 of a housing 8, which also includes the opposite section 9. The two sections 7 and 9 of the housing at a point where they join are flanged at 10, and secured together by means of the bolts or screws 11. These bolts or screws 11 pass through the flanges 10, as shown.

The head 4 while being circular has its outer periphery of a spherical shape, so as to permit the head 4 to move in the section 9 of the housing to accommodate any oscillatory movements required by the shaft sections.

The fact is the heads 3 and 4 may be considered as discs, provided with extension collars or sleeves 12, through which the shaft sections 1 and 2 extend. The disk heads are opposed face to face but slightly spaced apart, and threaded thereinto are screw elements 13, having lock nuts 14 threaded thereon to hold the screw elements locked rigidly in place. The lock nuts 14 have reduced extensions 15, which extend into annular cavities 16, constructed into disc heads.

The screw elements 13 are provided with heads 17, which are rectangular in cross section, therefore shoulders 18 are caused to be formed as shown. These shoulders 18 are drawn tight against the adjacent faces of the disc heads when the lock nuts 14 are tightened home.

When the two disk heads are positioned, as shown in the drawings, the heads 17 of the screw elements intermesh; that is, those of one disc head engage alternately between those of the opposite disc head.

The adjacent faces of the intermeshing heads 17 of the screw elements are provided with longitudinally arranged elongated cavities or depressions 19, which are arcuate in cross section, in such a manner as to permit anti-frictional ball bearings 20 to engage therewith and allow the disc heads to not only move axially toward and from each other but also to permit the shaft sections to oscillate slightly. The cavities or depressions 19 are also curved concentric with the center of the coupling, in order to insure permission of slight oscillatory movements of the two shaft sections. The confronting faces of said disk members having recesses 17a receiving parts of the heads 17, thereby preventing the heads from turning. The adjacent faces of the heads 17 have aligned enlarged portions 17b projecting from opposite sides of said heads, partially into which the depressions 19 extend, said enlarged portions providing abutments for the anti-friction members.

The invention having been set forth, what is claimed is:

A shaft coupling comprising a housing including detachably connected sections, a disk member adapted to be secured to shaft and having a straight periphery secured to one of said sections, a second disk member adapted to be secured to a second shaft and disposed in the other section in face to face relation to the other disk member, the periphery of the second disk member being transversely curved and spaced from its section, a plurality of screw elements secured to the disk members, heads included on the screw elements and extending from the confronting faces of the disk members in a manner whereby the heads of the screw elements of one disk member are alternately arranged with respect to the heads of the screw elements of the other disk member, said heads having elongated transversely curved depressions arranged in the opposite sides thereof, anti-friction members disposed between the heads and received in companion depressions, the confronting faces of the disk members having recesses of angular shape receiving parts of the heads, thereby preventing the heads from turning, aligned enlarged portions projecting laterally from the opposite sides of each head and having the depressions extending therein, and said enlarged portions providing abutments for the anti-friction members.

CHARLES L. JOHNSON.